United States Patent [19]

Neumann et al.

[11] Patent Number: 4,960,995

[45] Date of Patent: Oct. 2, 1990

[54] RADIATION DETECTOR

[75] Inventors: Adalbert Neumann, Hagen; Heinrich Stumpf, Schalksmühle, both of Fed. Rep. of Germany

[73] Assignee: Asea Brown Boveri Aktiengesellschaft, Mannheim, Fed. Rep. of Germany

[21] Appl. No.: 290,022

[22] Filed: Dec. 27, 1988

[30] Foreign Application Priority Data

Dec. 24, 1987 [DE] Fed. Rep. of Germany ....... 3744182

[51] Int. Cl.[5] .......................... G01J 5/04; G01J 5/06; G01J 5/08

[52] U.S. Cl. ................................ 250/347; 250/338.3; 250/339; 250/353

[58] Field of Search ....................... 250/339, 342, 347; 340/567

[56] References Cited

U.S. PATENT DOCUMENTS

| | | | |
|---|---|---|---|
| 4,192,372 | 3/1980 | Bellows | 250/342 X |
| 4,447,726 | 5/1984 | Mudge et al. | 250/342 |
| 4,604,524 | 8/1986 | Kotlicki et al. | 250/347 X |
| 4,769,545 | 9/1988 | Fraden | 250/342 X |
| 4,799,243 | 1/1989 | Zepke | 340/567 X |
| 4,841,284 | 6/1989 | Biersdorff | 250/342 X |

*Primary Examiner*—Constantine Hannaher
*Assistant Examiner*—Jacob M. Eisenberg
*Attorney, Agent, or Firm*—Herbert L. Lerner; Laurence A. Greenberg

[57] ABSTRACT

A radiation detector, serving as an infrared movement monitor, which is reactive to thermal radiation includes a housing having a window admitting the radiation and optics. The window having a size being coordinated with the angle of coverage of the optics disposed behind it. The optics focussing the radiation onto an optical sensor, preferably through a Fresnel lens. The window having a frame for accepting and guiding at least one masking element formed of a strip-shaped plastic film diminishing the infrared radiation and being slideably displaced in a guide channel along the window for covering the optics in a variable sub-region thereof.

14 Claims, 2 Drawing Sheets

Fig.1
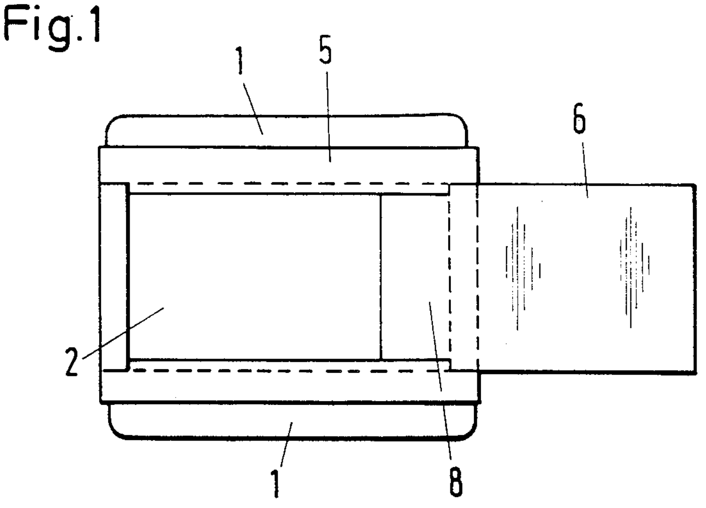
Fig.2
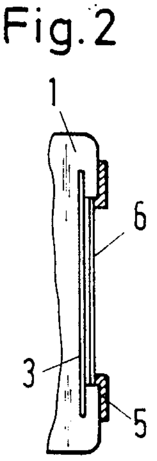
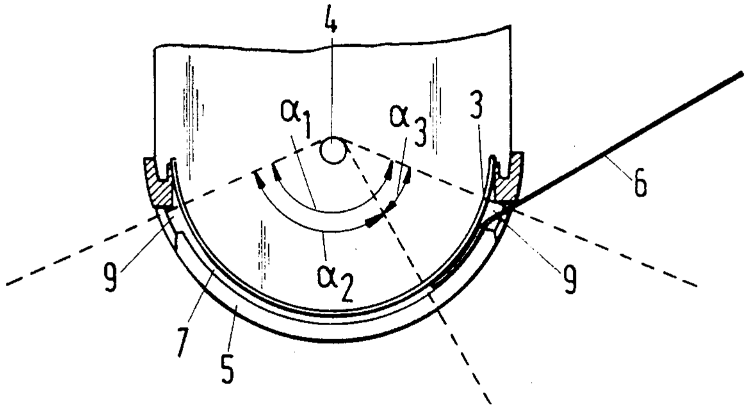
Fig.3
Fig.4
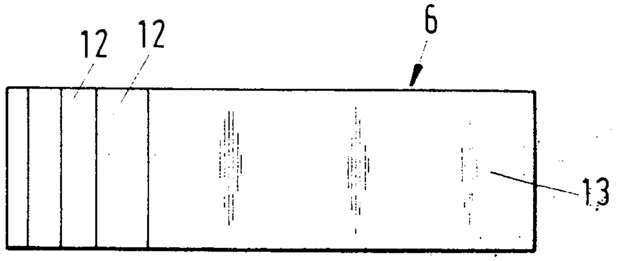

RADIATION DETECTOR

BACKGROUND OF THE INVENTION AND DESCRIPTION OF THE RELATED ART

The invention relates to a radiation detector, serving especially as a movement monitor, infrared detector reacting to thermal radiation, including a housing, and a window disposed in the housing for transmitting the radiation, having a size coordinated with the angle of coverage of optics disposed behind it, for focussing the radiation onto an optical sensor, preferably through a Fresnel lens.

Infrared detectors are used as movement monitors in zonal monitoring both inside and outside buildings. As passive detectors, they react directly to radiating objects which emit thermal radiation. An example of such a radiating object is also a person who intrudes into a zone to be monitored. There is consequently no need during monitoring for an additional transmitter such as is required with movement monitors of different types.

Whereas earlier, infrared detectors had only a relatively small, acute angle of coverage, one is known from EP-A2-0,113,468 which reaches an angle of coverage of up to 180° in the horizontal. With this detector, the thermal radiation is focussed with the aid of collecting optics onto a sensor which is sensitive in the infrared band. The collecting optics consist of a multiplicity of mutually interconnected individual collector lenses, arranged in a semicircle around the sensor. In this way, each individual collector lens forms a strip-shaped segment of an axially segmented cylindrical section. Moreover, the collector lenses have the structure of a Fresnel lens, so that a wide coverage is guaranteed not only in a radial direction to the cylindrical collecting optics, but also axially along the strip-shaped collector lens.

Assuming that a detector of the type described is mounted on a wall so that the axis of the cylindrical collecting optics is vertically aligned, then, depending on its range, it can monitor the plane extending horizontally before it as far as the wall to which it is attached. For most applications, it is desired to have an angle of coverage so wide that it offers the possibility of an almost uninterrupted monitoring of the zone lying before it. However, problems arise if the range of the detector is too large, i.e. if it extends into a region in which permitted radiating objects are present. It is certainly true that generally an adjustment can be achieved by reducing the sensitivity of the detector, but for the very narrow sites, at which, for example, a road or footpath passes by, this measure often does not produce the desired result.

In order to avoid false reports due to an excessive angle of coverage, use has already been made in the past of the possibility of limiting the angle of coverage. This was done by sticking a matching plastic film, opaque in the infrared range to the Fresnel lens. As a rule, however, success is not achieved in the first attempt to restrict the angle of coverage so that detection remains confined to the desired region. It is therefore necessary to undertake a fitting process which necessitates repeatedly removing the film from the lens and once again sticking it on. In this connection, soiling of the lens and even, on occasion, lasting damage is almost unavoidable.

It is accordingly an object of the invention to provide a radiation detector, which overcomes the hereinafore-mentioned disadvantages of the heretofore-known devices of this general type and which is equipped with simply constructed means for facilitating a reduction of the coverage present without these means. In particular, the adjustment of the coverage is to be provided easily and without damaging the lens.

SUMMARY OF THE INVENTION

With the foregoing and other objects in view there is provided, in accordance with the invention, an infrared radiation detector serving as an infrared movement monitor, which is reactive to thermal radiation, comprising a housing having a window admitting the radiation, optics, the window having a size being coordinated with the angle of coverage of the optics disposed behind it, the optics focussing the radiation onto an optical sensor, preferably through a Fresnel lens, the window having a frame for accepting and guiding at least one masking element formed of a strip-shaped plastic film diminishing the infrared radiation and being slideably displaced in a guide channel along the window for covering the optics in a variable sub-region thereof.

Appropriate embodiments and developments of the subject matter of the invention are given in the subclaims.

Without the insertion of a masking element, the frame provided with a guide channel has no effects on the acceptance angle of the optics. For the normal applications, in which it is desired to have as wide an angle of acceptance as possible, it is therefore possible for a masking element not to be introduced, or to be removed, or to be placed in a position in which it does not restrict the coverage of the optics. If, however, it is necessary to reduce the angle of coverage, it is generally possible to manage with a masking element which can be pushed from one side over the optics. This applies especially to cases in which the detector is located in an angle of a rectangular zone to be monitored. In this case, it is necessary to have an angle of coverage of about 90° facing the zone, which, with a 180° detector, means that about half of its optics must be masked. It is, however, advantageous to design the masking frame so that a guide channel is formed on both sides of the optics, so that it is also possible for a masking element to be inserted from both sides and be displaced towards the optics. In this connection the angle of coverage can be restricted as desired from one side or the other, but it may also be limited symmetrically to the optical axis.

It is possible to provide on at least one side directly next to the optics an opening through which the masking element may be pushed in. In this case, an end of the masking element which remains protruding from the guide channel after adjustment of the angle of acceptance can be removed, which, given a film, can take place by cutting with scissors. However, an advantageous development of the subject matter of the invention provides for extending the guide channel beyond the region of the window lying at the front face of the housing, so that it extends along the side face of the housing. A guide channel extended in this way facilitates the acceptance of a masking element in its entire length, if, for example, no masking is desired.

It is preferable that an opening for receiving the masking element is located at the end of the guide channel remote from the window, wherein this opening, or a second opening, facilitates grasping of the masking element. In this way, the masking element can easily be brought into the desired position in front of a sub-region of the optics.

In order to adjust the masking element, it must be capable of being gripped, which, in the simplest case, takes place by hand. For this purpose, the masking element, which is designed as a strip, can protrude from one of the openings with its end turned away from the window of the detector. If the guide channel is designed as a pocket in its end region, the end of the masking element remaining after the adjustment can be pushed into the pocket, which is open on one side, where it remains, but can also be extracted once again if needed.

However, a solution that is easier to use is provided in a further development of the invention, in which, at its end turned away from the window, the masking element has a manipulator, which, for example, can consist of a stem projecting at right angles. This stem must protrude from the guide channel, so that it can be gripped by hand. In order to enable the masking element to be displaced, there is provided along the guide channel a slot which is exactly so wide that the manipulator can move therein, but the guide channel for the wider masking element is not affected.

As a rule, the optics of the detector are so designed that an appropriately differing acceptance angle is produced both in the horizontal and in the vertical plane. Using the means of the invention it is possible to limit both acceptance angles. However, the predominant feature of the invention is a limitation of the acceptance angle lying in the horizontal plane.

In order to form the guide channel, the frame can be constructed directly at the housing. Use will be made of this possibility if a new housing is to be constructed. For housings which already exist, it is advantageous to design the frame as a separate part, which can be mounted on the housing. It is advantageous to design such a frame provided with flexible clamping elements in such a way that it is anchored at the housing. In this connection, it is necessary for the region of the window, and for mounting elements provided for mounting the housing, to remain free, and the same applies, if required, to feed lines lying outside.

The masking element, which is preferably film-like and strip-shaped, can be adjusted to the particular requirements of the user. In the simplest case, it consists of material opaque in the infrared. However, it is further possible not to limit the angle of coverage abruptly, but merely to reduce the sensitivity of the detector in a sub-region. In this case, use is made of an infrared-attenuating film.

Assuming that the detector is normally least sensitive at the two ends of its optics remote from the optical axis, use can be made, on the one hand, of this circumstance, or also of a film, which is adjusted to the requirements of the user, and has regions of differing infrared attenuation. This is achieved by laying several films of differing attenuation one above the other in steps, so that sub-regions are produced which are formed in each case of only one, two or several films. If required, it is, of course, also possible to dispense with these steps, and to achieve the desired total attenuation by laying several infrared attenuating films one above the other in a flush fashion. In order not to dislocate the relative position of the attenuating films, an infrared-transparent carrier can be employed, on to which the films are stuck in the desired formation. In the simplest case, this carrier is a transparent self-adhesive film, but it can also consist of a more robust transparent film, and be provided with the manipulator described earlier, in order to facilitate an adjustment of the masking element.

In accordance with another feature of the invention, the guide channel reaches beyond the region of the window lying at the front face of the housing and is continued further on both side at the adjoining side face of the housing.

In accordance with a further feature of the invention, on at least one side, the guide channel has a first opening through which the masking element can be pushed, including at least one second opening which facilitates grasping of the masking element, and by means of which it is brought into the desired position before a sub-region of the optics.

In accordance with an added feature of the invention, the masking element, designed as a strip, limits the angle of coverage of the optics with its first end, and at its second end, which protrudes from the opening, can be grasped by hand, and be varied in position.

In accordance with an additional feature of the invention, in a line extending the guide channel a pocket lying in the same direction is formed, for receiving, after adjustment, the end of the flexible masking element that can be grasped by hand, and taken out again as required.

In accordance with yet another feature of the invention, there is provided a manipulator, wherein the end of the strip-shaped masking element, not protruding into the region of the window is attached to the manipulator, with a stem projecting at approximately a right angle to the masking element, which protrudes from the guide channel and wherein, when the masking element is displaced, the manipulator moves in a slot opening the guide channel outwards, the guide channel being narrower than the strip-shaped masking element.

In accordance with yet a further feature of the invention, the masking element limits the angle of coverage, and is disposed in a horizontal plane.

In accordance with yet an added feature of the invention, the frame includes the housing with the guide channel.

In accordance with yet an additional feature of the invention, the frame forms together with the guide channel a separate part, which can be mounted on the housing so that it does not affect the region of the window, including mounting elements provided at the housing, and feed lines lying outside the housing.

In accordance with still another feature of the invention, there are provided flexible clamping elements on the frame embracing the housing, with which it may be mounted self-adhesively on the housing.

In accordance with still a further feature of the invention, the frame encloses all six sides of an essentially cuboid housing, at and least two faces of the housing remain accessible thereby via cutouts.

In accordance with still an added feature of the invention, there is provided at least one of an infrared-transparent and an infrared-attenuating material for forming the strip-shaped masking element.

In accordance with still an additional feature of the invention, the guide channel is dimensioned in relation to the masking element so that it is possible to lay a plurality of infrared-attenuating films one above the other, the laying of the films one above the other, the layers of the films one above the other are flush.

In accordance with a concomitant feature of the invention, the guide channel is dimensioned in relation to the masking element, so that it is possible to lay a plurality of infrared-attenuating films one above the other, the layers of the films one above the other being mutually offset.

Other features which are considered as characteristic for the invention are set forth in the appended claims.

Although the invention is illustrated and described herein as embodied in a radiation detector, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWING

FIG. 1 is a diagrammatic, front-elevational view of the radiation detector, looking towards the window;

FIG. 2 is a fragmentary, partially sectional, side-elevational view of the housing with a mounted frame, as seen along the optical axis from the side:

FIG. 3 is a fragmentary, partially sectional, top-plan view of the front part of the detector;

FIG. 4 is a front-elevational view of a masking element composed of several films:

DESCRIPTION OF THE PREFERRED EMBODIMENTS

Figure 5:
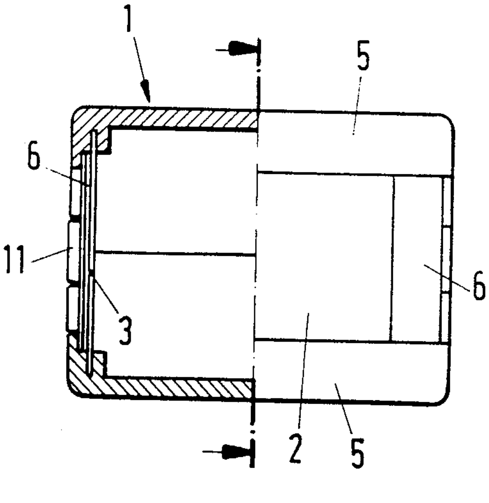
FIG. 5 is a half-sectional, front-elevational view of the detector with a section line lying behind the frame.

Referring now to the figures of the drawing in detail and first, particularly, to FIGS. 1–3 thereof, there is seen a radiation detector having a housing 1, which is provided at the front side with a window 2, in which optics 3 in the form of a Fresnel lens are disposed. The optics 3 have an angle of coverage $\alpha_1$, which in this case is somewhat smaller than 180°. The infrared radiation received in the region of the angle of coverage $\alpha_1$ is focussed onto a sensor 4 by the optics 3.

In the present example, a frame 5 is stuck on top of the housing 1, and could equally well be constructed to fit flush. As may be seen in particular from FIG. 3, the frame 5 forms with the optics 3 a guide channel 7, in which a masking element 6 can be inserted. In this process, the masking element 6, which is preferably designed as strip-shaped film, is pushed into a sub-region 8 before the optics 3, which are masked in an angular region $\alpha_3$. To the extent that the masking element 6 is opaque to infrared radiation, no radiation is fed to the sensor 4 in the region of the angle $\alpha_3$. If, however, the masking element 6 has only an attenuating effect, the infrared radiation received by the sensor 4 is reduced. The actual angle of coverage, with which the infrared detector receives the infrared radiation undiminished is thereby reduced to an angle of $\alpha_2$.

According to the invention, the detector is provided on both sides with openings 9, which lie in the end region of the optics 3, and facilitate the insertion of the masking element 6. In this way, it is possible to limit the horizontally extending angle of coverage$\alpha$alternatively with a masking element 6 on one side, or with a masking element on each side.

Figure 6:
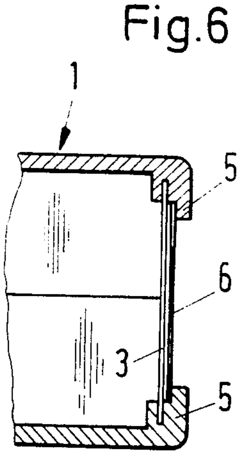
FIG. 6 is a fragmentary, partially sectional, side-elevational view of the detector, in a section extending along the optical axis.
Figure 7:
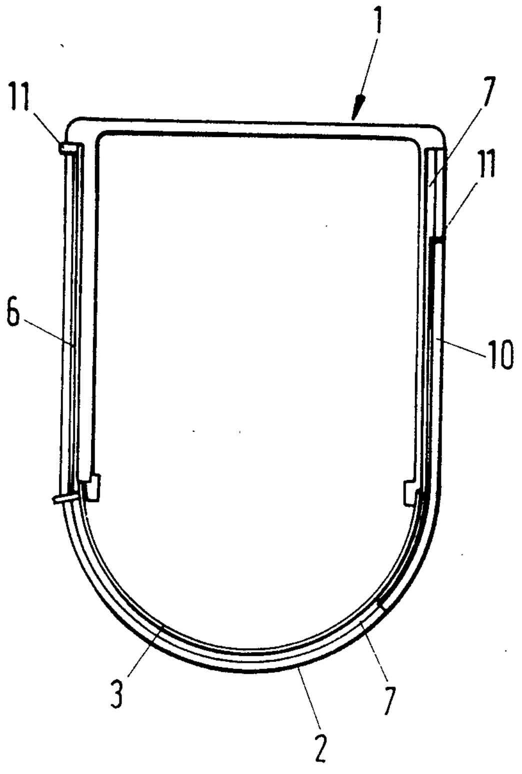
FIG. 7 is a top-plan view of the detector, displaying the guide channel.
Figure 8:
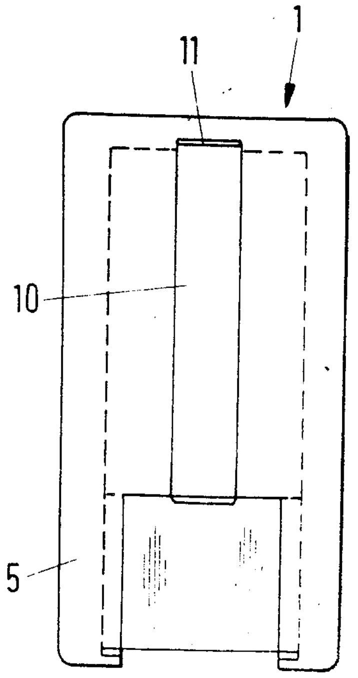
FIG. 8 is a side-elevational view of the detector.

A second variant for the design of a guide channel 7 with the aid of a frame 5 is represented in FIGS. 5 to 8. It may be seen in FIGS. 5 and 6 that the frame 5 is constructed flush at the housing 1. In order to obtain the guide channel 7 which can be seen especially clearly in FIG. 7, the frame 5 surrounding it is extended over the front side of the housing 1 into the region of its two side walls. With this solution, the part of the guide channel 7 extending into the region of the side walls can receive the masking element 6 in its entire length. It follows that in this embodiment the detector can be provided in principle with a masking element 6, which is pushed into the region of the optics, however, only if required.

For the purpose of easier manipulation when adjusting, the masking element 6 is provided at its end lying away from the window with a manipulator 11, which can be gripped by the hand, or also a tool. As may be seen from FIGS. 7 and 8, a stem, which protrudes from the plane of the masking element approximately at a right angle, serves as manipulator. In this connection, the manipulator 11 is narrower than the masking element 6, so that a correspondingly narrow slot 10 suffices during displacement of the masking element to ensure the mobility of the stem 11, or, on the other hand, to prevent the masking element 6 from falling out. Note further that the manipulator 11 can also be arranged in the region of the window or at any other chosen point, provided only that its free mobility is ensured.

A further alternative to the types of frame represented in the drawings is provided with a frame that can be fitted on top. No dedicated drawing has been produced for this purpose, because there is no change in the basic construction of the frame, or of the guide channel formed thereby, and the elements serving as channel formed thereby, and the elements serving to anchor the frame to the housing are generally known. Such a separate frame can also be designed from flexible material, so that the frame can be pushed on to the housing by being stretched briefly. There is also no need to explain further that the frame must leave the parts of the housing freely, which because of their construction allow no masking.

As FIG. 4 shows, by appropriate design of the masking element 6, the radiation detector can be even more universally adapted to its particular application. It can, for example, be desired that the masking element 6 could be entirely opaque for infrared radiation in the sub-region of the angle of coverage, or that it should, if necessary, only attenuate it. In order to obtain a definite attenuation, it can be necessary to work with films which absorb the infrared radiation very differently. In addition, it is by no means always necessary to have the same degree of absorption in the entire sub-region 8. In order, therefore, to do justice to the possibly very different requirements, it would be necessary to have a broad range of differing masking elements 6 on hand, which would entail keeping a corresponding stock.

However, according to the invention, this object can be relatively simply achieved in that only one film of relatively low absorption is held ready, and then the masking element 6 is obtained by laying one above the other several films having the desired infrared transparency. Depending on the application, individual films 12 can be laid flush one above the other, or, as represented in FIG. 4, be offset in steps relative to one another. In the last case, too, the strip-shaped films 12 can have the same length, and thereby be arbitrarily stepped. In order that the films 12 do not become mutually dislocated, it is possible to stick them on to a transparent carrier 13. The carrier can be an infrared-transparent self-adhesive film, or also be provided as a special construction having a manipulator at its end. With a Fresnel zone plate, wherein the individual steps of differing infrared transparency can be adapted to the width of the individual zones of the lens. The differing sensitivities in the border region of the optics can also be compensated hereby.

The foregoing is a description corresponding in substance to German Application P 37 44 182.5, dated Dec. 24, 1987, the International priority of which is being claimed for the instant application, and which is hereby made part of this application. Any material discrepancies between the foregoing specification and the aforementioned corresponding German application are to be resolved in favor of the latter.

We claim:

1. Radiation detector, serving as an infrared movement monitor, which is reactive to thermal radiation, comprising a housing having a window admitting the radiation, optics, the window having a size being coordinated with the angle of coverage of the optics disposed behind it, the optics focussing the radiation onto an optical sensor, preferably through a Fresnel lens, the window having a frame for accepting and guiding at least one masking element formed of a strip-shaped plastic film diminishing the infrared radiation and being slideably displaceable in a guide channel along the window for covering the optics in a variable sub-region thereof.

2. Detector according to claim 1, wherein the guide channel reaches beyond the region of the window lying at the front face of the housing and is continued further on both side at the adjoining side face of the housing.

3. Detector according to claim 2, wherein on at least one side, the guide channel has a first opening through which the masking element can be pushed, including at least one second opening which facilitates grasping of the masking element, and by means of which it is brought into the desired position before a sub-region of the optics.

4. Detector according to claim 1, wherein the masking element, designed as a strip, limits the angle of coverage of the optics with a first end, and at its second end, which protrudes from the opening, can be grasped by hand, and be varied in position.

5. Detector according to claim 1, wherein, in a line extending the guide channel a pocket lying in the same direction is formed, for receiving, after adjustment, an end of the flexible masking element that can be grasped by hand, and taken out again as required.

6. Detector according to claim 1, Including a manipulator, wherein the end of the strip-shaped masking element, not protruding into the region of the window is attached to the manipulator, with a stem projecting at approximately a right angle to the masking element, which protrudes from the guide channel and wherein, when the masking element is displaced, the manipulator moves in a slot opening the guide channel outwards, the guide channel being narrower than the strip-shaped masking element.

7. Detector according to claim 1, wherein the masking element limits the angle of coverage, and is disposed in a horizontal plane.

8. Detector according to claim 1, wherein the frame includes the housing with the guide channel.

9. Radiation detector, serving as an infrared movement monitor, which is reactive to thermal radiation, comprising a housing having a window admitting the radiation, optics, the window having a size being coordinated with the angle of coverage of the optics disposed behind it, the optics focussing the radiation onto an optical sensor, preferably through a Fresnel lens, the window having a frame for accepting and guiding at least one masking element formed of a strip-shaped plastic film diminishing the infrared radiation and being slidably displaceable in a guide channel along the window for covering the optics in a variable sub-region thereof, wherein the frame forms together with the guide channel a separate part, which can be mounted on the housing so that it does not affect the region of the window, including mounting elements provided at the housing, and feed lines lying outside the housing.

10. Detector according to claim 1, including flexible clamping elements on the frame embracing the housing, with which it may be mounted self-adhesively on the housing.

11. Detector according to claim 1, wherein the frame encloses all six sides of an essentially cuboid housing, at and least two faces of the housing remain accessible thereby via cutouts.

12. Detector according to claim 1, including at least one of an infrared-transparent and an infrared-attenuating material for forming the strip-shaped masking element..

13. Detector according to claim 1, wherein the guide channel is dimensioned in relation to the masking element so that it is possible to lay a plurality of infrared-attenuating films one above the other,·the laying of the films one above the other, the layers of the films one above the other are flush.

14. Radiation detector, serving as an infrared movement monitor, which is reactive to thermal radiation, comprising a housing having a window admitting the radiation, optics, the window having a size being coordinated with the angle of coverage of the optics disposed behind it, the optics focussing the radiation onto an optical sensor, preferably through a Fresnel lens, the window having a frame for accepting and guiding at least one masking element formed of a strip-shaped plastic film diminishing the infrared radiation and being slidably displaceable in a guide channel along the window for covering the optics in a variable sub-region thereof, wherein the guide channel is dimensioned in relation to the masking element, so that it is possible to lay a plurality of infrared-attenuating films one above the other, the layers of the films one above the other being mutually offset.

* * * * *